United States Patent [19]

Kamman et al.

[11] 4,056,044
[45] Nov. 1, 1977

[54] OIL COOLED PISTON

[75] Inventors: Kenneth R. Kamman, Edelstein; Wayne D. Jacobson, Peoria, both of Ill.

[73] Assignee: Caterpillar Tractor Co., Peoria, Ill.

[21] Appl. No.: 631,247

[22] Filed: Nov. 12, 1975

[51] Int. Cl.² ................................ F01B 31/10
[52] U.S. Cl. ................................ 92/159; 92/160; 123/41.35
[58] Field of Search .................. 92/159, 160, 158; 123/41.35

[56] References Cited

U.S. PATENT DOCUMENTS

| 1,430,928 | 10/1922 | Spencer | 92/159 |
|---|---|---|---|
| 1,489,708 | 4/1924 | Morse | 92/159 |
| 1,492,294 | 4/1924 | Hanish et al. | 92/160 |
| 1,745,860 | 2/1930 | Noble | 92/160 |
| 2,695,824 | 11/1954 | Klingel, Jr. | 92/160 |
| 2,865,348 | 12/1958 | Kramer et al. | 123/41.35 |
| 3,221,718 | 12/1965 | Isley | 123/32 |
| 3,314,402 | 4/1967 | Tillack | 123/41.35 |
| 3,448,664 | 6/1969 | Hulsing | 92/160 |
| 3,877,351 | 4/1975 | Barfiss | 92/186 |

FOREIGN PATENT DOCUMENTS

| 1,476,393 | 1969 | Germany | 123/41.35 |
|---|---|---|---|
| 326,687 | 1958 | Switzerland | 123/41.35 |

Primary Examiner—Paul E. Maslousky
Attorney, Agent, or Firm—Wegner, Stellman, McCord, Wiles & Wood

[57] ABSTRACT

An improved piston assembly including a generally cylindrical piston body having a crown, a depending relatively short ring land and a central cavity comprising inner and outer chambers. Seal receiving grooves are disposed in the ring land and are adapted to receive sealing rings, one of the grooves being specifically adapted to receive an oil ring. A generally cylindrical skirt body is provided and has an end in proximity to the piston body adjacent the ring land and is aligned with the piston body. An annular groove in the end of the skirt body opens into the outer chamber of the central cavity for receiving cooling oil draining from the cavity and for splashing the cooling oil against the interior of the piston body to cool the same. Bores from the oil ring receiving groove convey oil from such groove to the annular groove.

6 Claims, 2 Drawing Figures

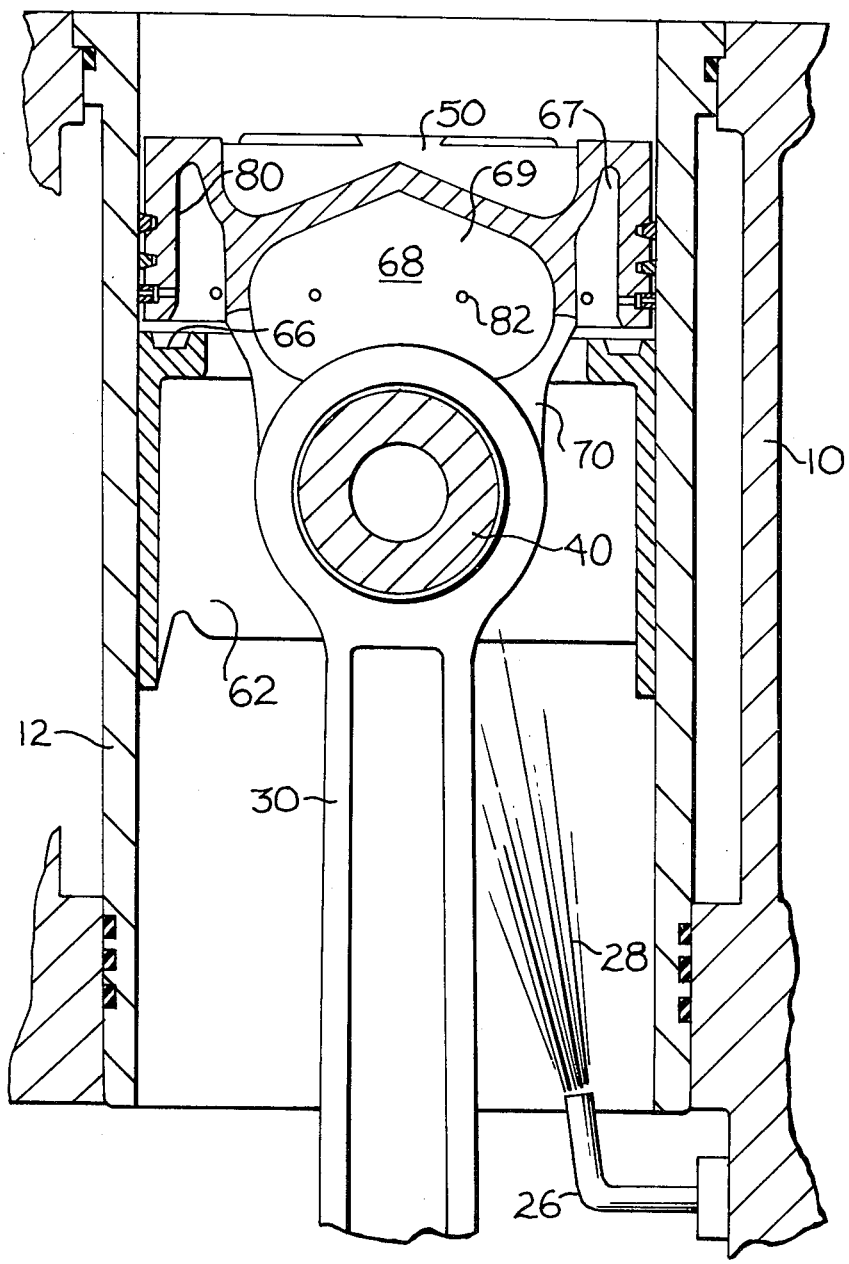

OIL COOLED PISTON

BACKGROUND OF THE INVENTION

This invention relates to piston assemblies for reciprocating mechanisms such as engines, pumps, compressors, or the like. More specifically, the invention relates to improved means for cooling such pistons.

Prior art of possible relevance includes the following U.S. Pat. Nos.: 2,865,348 issued Dec. 23, 1958 To Kramer et al; 3,221,718 issued Dec. 7, 1965 to Isley; 3,314,402 issued Apr. 18, 1967 to Tillack; and 3,877,351 issued Apr. 15, 1975 to Barfiss.

Constant efforts are being made to improve the construction of pistons employed in reciprocating mechanisms such as internal combustion engines, pumps, compressors, or the like. In many applications, it is necessary that the pistons effectively resist high temperatures which can cause overheating and cracking of the piston and which contribute to the deposit of residues on sealing rings and associated grooves.

In general, the various approaches to improvement can be categorized as improvements in structural design, improvements in metallurgy, and improvements in cooling. The present invention is concerned with the latter and the above identified prior art is exemplary of the state of the art.

One difficulty in providing for improved cooling of pistons is the accomplishing of effective circulation of the coolant fluid, normally lubricating oil, in a simple structure. As can be seen from the above mentioned patents, many structures which provide for good coolant circulation are quite complicated in terms of their structure. Thus, they are disadvantageous in terms of fabrication costs, both from the standpoint of casting various formations or coolant conduits and from the standpoint of assembly where multiple parts are employed. Others, while simple in construction, do not provide for as efficient cooling.

Thus, there is a real need for an improved piston assembly where effective cooling is attained while fabrication costs are minimized.

SUMMARY OF THE INVENTION

It is the principal object of the invention to provide a new and improved piston assembly having improved cooling means which effectively cool the piston during operation and which are economically fabricated.

An exemplary embodiment of the invention achieves the foregoing object in a structure including a generally cylindrical piston body having a crown, a depending relatively short ring land, and a central cavity comprising inner and outer chambers. Seal receiving grooves are disposed in the ring land and are adapted to receive sealing rings. A generally cylindrical skirt body is provided and has an end substantially abutting the ring land of the piston body. It is aligned with the piston body. An annular groove is disposed in the end of the skirt body and opens into the central cavity of the piston body for receiving lubricant draining from the cavity and for splashing the lubricant, during reciprocation of the piston, against the interior of the ring land to cool the same in the vicinity of the seal receiving grooves.

A highly preferred embodiment of the invention includes a cross bore in the skirt body for receiving a conventional wrist pin and the piston body includes a pair of depending bosses each having a wrist pin receiving aperture aligned with the cross bore so that the parts may be readily assembled.

An exemplary embodiment of the invention includes an annular rib depending from the piston crown and supporting the dependng bosses in spaced relation to the skirt body so that the coolant or lubricant can be sprayed upwardly to be collected by or splashed into the annular groove and the central cavity of the piston body.

In a highly preferred embodiment of the invention, one of the grooves in the ring land is adapted to receive an oil ring and bores extend from such groove to the interior of the piston body. Thus, lubricant scraped from the cylinder receiving the piston by the oil ring will be directed to the annular groove via such bores to act as a coolant.

Other objects and advantages will become apparent from the following specificaton taken in connection with the accompanying drawings.

DESCRIPTION OF THE DRAWINGS

FIG. 2 is a vertical section of the piston assembly taken approximately along the line 2—2 of FIG. 1.

DESCRIPTION OF THE PREFERRED EMBODIMENT

Figure 1:
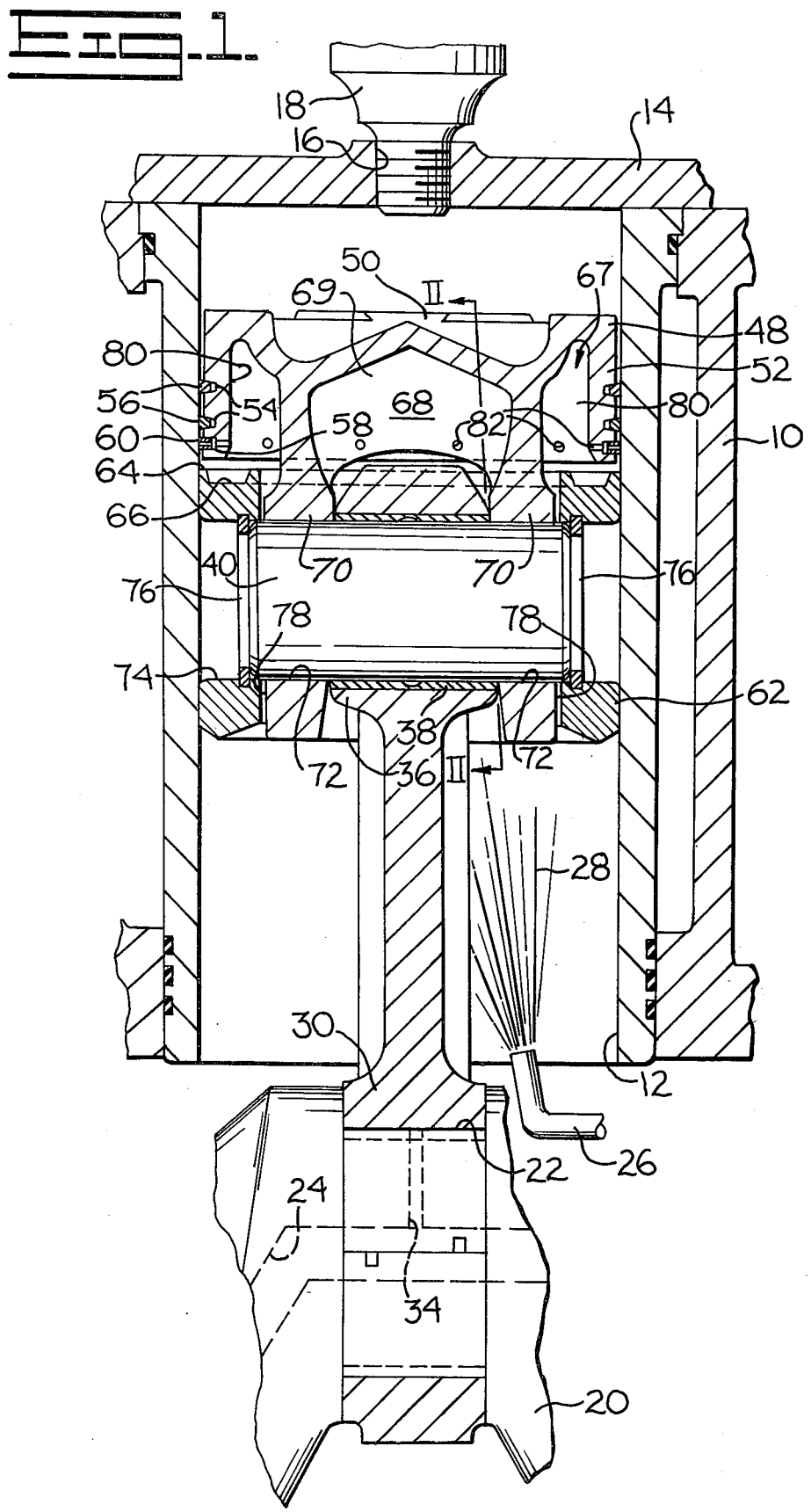
FIG. 1 is a vertical section of a reciprocating mechanism, an engine, employing a piston assembly made according to the invention.

An exemplary embodiment of a piston assembly made according to the invention is illustrated in the drawings in connection with a reciprocating mechanism in the form of an engine. However, it is to be understood that the same is not limited to use in engines, but may be advantageously employed in other recirpocating mechanism, such as pumps, compressors, or the like, where it is desired to cool the piston assembly by means of the lubricating medium.

With reference to FIG. 1, the reciprocating mechanism includes a block 10 fitted with a cylinder liner 12 defining the cylinder in which the piston assembly will reciprocate. The mechanism also includes a head 14 provided with a tapped opening 16 for receipt of an element 18. The element 18 may be a spark plug, if the engine is a spark ignition engine, or may be a fuel injection nozzle if the engine is a diesel engine.

The mechanism also includes a crank shaft 20 having an eccentric 22, both being provided with an interior lubricant conduit 24 as is conventional. A cooling oil directing nozzle 26 is disposed below the lower end of the liner 12 and is connected to a source of lubricant under pressure in a conventional fashion for directing oil upwardly into the cylinder, as illustrated at 28.

A connecting rod 30 is journalled by means of suitable bearings on the eccentric 22 and receives lubricant under pressure from the conduit 24 via a radially extending port 34 in the eccentric 22.

The rod 30 includes an upper or "eye" end which receives a sleeve bearing 38 for the purpose of journalling the rod 30 on a wrist pin 40. Because of the relative rocking movement between the rod end 36 and the wrist pin 40 is minimal, sufficient lubricant for the interface defined by the bearing 38 is provided by the nozzle 26 to provide adequate lubrication.

The piston assembly includes a main body 48 of generally cylindrical configuration. The main body 48 includes a crown 50 and a depending, relatively short, ring land 52. The ring land 52 is provided with peripheral grooves 54 for receipt of compression rings 56 and a further peripheral groove 58 for receipt of a conventional oil ring 60. The piston assembly also includes a second element or skirt body 62, also of generally cylindrical configuration.

As seen in FIG. 1, the upper end 64 of the skirt body 62 is in proximity to the ring land 52 of the main body 48 and includes an annular groove 66 which opens upwardly toward the crown 50 and into the outer chamber 67 of a central cavity 68 in the main body 48. The central cavity 68 also includes an inner chamber 69 open to the crank case as best seen in FIG. 2.

The skirt body 62 is secured to the main body 48 as follows. A pair of bosses 70 are supported by an annular rib 71 and are disposed within the cavity 68 depending relation from the crown 50 and include aligned apertures 72 for receipt of the wrist pin 40. The skirt body 62 includes a cross bore 74 which is aligned with the apertures 72 for receipt of the ends of the wrist pin 40 as illustrated. Snap retaining rings 76 are employed for positively locating the wrist pin 40 in the position illustrated in FIG. 1.

Lubricating oil is directed to outer chamber 67 and surface 80 thereof radially outwardly of the bosses 70 by means of a series of bores 82 extending through the short ring land 52 into the oil ring receiving groove 58. During operation of the mechanism, the oil scraped off of the wall of the liner 12 by the oil ring 60 will be directed into the groove 58 and through the bores 82 into the interior of the assembly.

It will be seen that oil emerging from the bores 82 may drain downwardly into the annular groove 66. At the same time, oil splashed against surface 80 of chamber 67 by the nozzle 26 will similarly drain into the groove 66. During operation of the mechanism, the oil in the groove 66 will be continually splashed upwardly against that portion of the ring land 52 having the ring receiving grooves 54 and 58 therein to cool the same.

As shown in FIG. 2, oil emerging from the nozzle 26 also will be directed alternately and forcefully into both chambers 67 and 69 of central cavity 68 due to piston reciprocation changing the relative alignment of jet 26. The combined coactive interior surfaces of crown 50, bosses 70 and ring land 52 are such that the impinging lubricating and cooling oil effectively conditions all critical surfaces and areas It is to be noted that a small gap is preferably provided between ring land 52 and skirt body 62 to prevent transfer of rocking and twisting loads between the coacting members. This gap will also tend to collect and communicate inwardly a supplemental supply of oil for groove 66 which assures an adequate volume of fluid for piston cooling purposes.

It will accordingly be appreciated that a piston assembly made according to the invention provides excellent cooling of the crown of the assembly to preclude overheating and cracking. At the same time, excellent cooling to the area of the piston assembly bearing the rings 56 and 60 is provided so that residue accumulation tending to cause such rings to stick, is avoided. It will also be appreciated that the piston assembly is quite simple in its construction and does not require specialized casting techniques or undue difficulty in the assembly of parts. In this connection, it will be observed that the unique arrangement of the wrist pin 40 with respect to the bosses 70 and the cross bore 74 in the skirt body 62 not only provides the usual function of journalling the piston rod, but also serves to maintain the piston assembly in assembled relation. Moreover, it will be recognized that this arangement permits easy serviceability and/or replacement of either of the piston parts independently of the other.

We claim:

1. A piston assembly comprising:
   a generally cylindrical piston body having a crown, a depending, relatively short ring land and a central cavity;
   seal receiving groove means in said ring land adapted to receive sealing rings;
   a generally cylindrical skirt body having an end in proximity to said ring land and aligned with said piston body; and
   an annular, imperforate groove in said end opening into said central cavity for receiving a lubricant draining from said central cavity and for splashing the lubricant, during reciprocation of said piston, against the interior of said ring land to cool the same in the vicinity of said groove means;
   said skirt body including a cross bore for receiving a wrist pin and said piston body including a depending rib and a pair of bosses each having a wrist pin receiving aperture aligned with said cross bore.

2. The piston assembly of claim 1 wherein the radially outer surface of said rib is spaced from said skirt body so that lubricant emerging from a supply nozzle may splash into said annular groove and said central cavity.

3. A piston assembly comprising:
   a generally cylindrical piston body having a crown, a depending, relatively short ring land and a central cavity;
   seal receiving groove means in said ring land adapted to receive sealing rings;
   a generally cylindrical skirt body having an end in proximity to said ring land and coaxially aligned with said piston body; and
   an annular, imperforate groove in said end opening into said central cavity for receiving a lubricant draining from said central cavity and for splashing the lubricant, during reciprocation of said piston, against the interior of said ring land to cool the same in the vicinity of said groove means;
   said groove means including a peripheral groove in said ring land for receiving an oil ring; and means in said ring land establishing fluid communication between said peripheral groove and said central cavity so that lubricant scraped from a cylinder receiving said piston will be directed to said annular groove to cool said piston body.

4. A piston assembly comprising:
   a generally cylindrical piston body having a crown, a depending ring land, a skirt and a central cavity;
   a peripheral oil ring receiving groove on a portion of said ring land;
   an annular, imperforate groove in said skirt opening toward said crown and adjacent said central cavity, said peripheral groove being located between said crown and said annular groove along the length of said skirt; and
   a plurality of ports extending through said ring land from said peripheral groove to a portion of said central cavity for directing oil received in said peripheral groove to said annular groove to be splashed therefrom to cool said piston body.

5. A piston assembly comprising:
   a generally cylindrical piston body having a crown, a depending ring land, a skirt and a central cavity;

a peripheral oil ring receiving groove on a portion of said ring land;

an annular imperforate groove in said skirt opening toward said crown and within said central cavity, said peripheral groove being located between said crown and said annular groove along the length of said skirt; and a plurality of ports extending through said piston body from said peripheral groove to a portion of said central cavity for directing oil received in said peripheral groove to said annular groove to be splashed therefrom to cool said piston body, said piston body being defined by first and second cylindrical elements; said first element including said crown and said ring land including said peripheral groove, said second element including said skirt, said annular groove being located in an end of said second element, and means releasably securing said first and second elements together.

6. A piston assembly comprising:

a generally cylindrical piston body having a crown, a depending, relatively short ring land and a central cavity including inner and outer chambers in fluid communication with each other;

an oil ring receiving groove in said ring land;

a plurality of lubricant ports extending radially inwardly from said oil ring receiving groove to said outer chamber for directing lubricant to said outer chamber;

a pair of apertured bosses depending from said piston body within said central cavity;

a generally cylindrical skirt body having an end adjacent said ring land and aligned with said piston body;

a cross bore in said skirt body aligned with said apertured bosses;

a wrist pin extending through said cross bore and said apertured bosses to secure said bodies together;

said apertured bosses being spaced from said skirt body so that lubricant emerging from a supply nozzle may be directed to both the inner and outer chambers of said central cavity; and an annular, imperforate, upwardly opening groove in said skirt body end opening into said central cavity peripherally about said outer chamber for receiving lubricant draining therefrom and for splashing the lubricant, during reciprocation of said piston against the interiors of said crown and said ring land to cool the same.

* * * * *